United States Patent
Medda et al.

(10) Patent No.: US 11,408,338 B2
(45) Date of Patent: Aug. 9, 2022

(54) AIRCRAFT PROPULSION SYSTEM INCLUDING A HEAT EXCHANGER SYSTEM

(71) Applicants: Airbus SAS, Blagnac (FR); Airbus Operations SAS, Toulouse (FR); Airbus Operations, S.L., Getafe (ES)

(72) Inventors: Bruno Medda, Tournefeuille (FR); Esteban Martino-Gonzalez, Aranjuez (ES); Thomas Stevens, Tournefeuille (FR); Julien Cayssials, Gagnac sur Garonne (FR); Juan Tomas Prieto Padilla, Madrid (ES); Adeline Soulie, Verdun sur Garonne (FR); Didier Poirier, Blagnac (FR); Pierre-Alain Pinault, Tournefeuille (FR); Diego Barron Vega, Madrid (ES)

(73) Assignees: AIRBUS SAS, Blagnac (FR); AIRBUS OPERATIONS SAS, Toulouse (FR); AIRBUS OPERATIONS S.L., Getafe (ES)

( * ) Notice: Subject to any disclaimer, the term of this patent is extended or adjusted under 35 U.S.C. 154(b) by 346 days.

(21) Appl. No.: 16/814,506

(22) Filed: Mar. 10, 2020

(65) Prior Publication Data

US 2020/0347782 A1 Nov. 5, 2020

(30) Foreign Application Priority Data

Mar. 11, 2019 (EP) .................................... 19162032

(51) Int. Cl.
*F02C 6/08* (2006.01)
*B64D 15/04* (2006.01)
(Continued)

(52) U.S. Cl.
CPC ................ *F02C 6/08* (2013.01); *B64D 15/04* (2013.01); *F02C 7/047* (2013.01); *F02C 7/10* (2013.01);
(Continued)

(58) Field of Classification Search
CPC ........ B64D 15/04; B64D 13/06; B64D 13/08; B64D 2033/0233; F02C 6/08; F02C 7/10;
(Continued)

(56) References Cited

U.S. PATENT DOCUMENTS 5,402,967 A * 4/1995 Hughes .................. B64D 13/06
62/402
6,058,725 A 5/2000 Monfraix et al.
(Continued)

FOREIGN PATENT DOCUMENTS

EP 0934876 A1 8/1999
WO 2018002855 A1 1/2018

OTHER PUBLICATIONS

European Search Report; priority document.

*Primary Examiner* — Craig Kim
(74) *Attorney, Agent, or Firm* — Greer, Burns & Crain, Ltd.

(57) ABSTRACT

An aircraft propulsion system, including a turbojet and a heat exchanger system including a main heat exchanger, a hot air supply pipe and regulating valve, a high pressure pipe bleeding high pressure stage hot air through a first valve, an intermediate pressure pipe bleeding intermediate pressure stage hot air through a second valve, a pipe transferring hot air to an air management system, a main supply pipe supplying fan duct cold air including a main regulating valve, an evacuation pipe expelling air to the outside, a sub heat exchanger, wherein the supply pipe from the regulating valve goes through the sub heat exchanger, a sub supply pipe (Continued)

supplying cold air from the main supply pipe, a sub evacuation pipe expelling air to the fan duct, a temperature sensor measuring hot air temperature exiting the main heat exchanger, and a controller controlling the valves according to the measured temperature.

6 Claims, 3 Drawing Sheets

(51) Int. Cl.
  *F02C 7/047* (2006.01)
  *F02C 7/10* (2006.01)
  *B64D 33/02* (2006.01)
(52) U.S. Cl.
  CPC ............... *B64D 2033/0233* (2013.01); *F05D 2220/323* (2013.01); *F05D 2260/208* (2013.01)
(58) Field of Classification Search
  CPC ............... F02C 7/047; F05D 2220/323; F05D 2260/208
  See application file for complete search history.

(56) References Cited

U.S. PATENT DOCUMENTS

| | | | |
|---|---|---|---|
| 6,124,646 A * | 9/2000 | Artinian | B64D 13/06 60/39.01 |
| 6,128,909 A * | 10/2000 | Jonqueres | B64D 13/06 62/93 |
| 10,247,097 B2 * | 4/2019 | Suciu | F02C 6/08 |
| 2012/0045317 A1 | 2/2012 | Saladino | |
| 2015/0247463 A1 * | 9/2015 | DeFrancesco | B64D 13/06 60/782 |
| 2016/0369705 A1 * | 12/2016 | Mackin | F02C 6/08 |
| 2018/0128176 A1 * | 5/2018 | Staubach | F02C 7/141 |
| 2019/0202567 A1 | 7/2019 | Epp et al. | |
| 2019/0285324 A1 * | 9/2019 | Valiquette | B64D 13/06 |
| 2019/0383167 A1 * | 12/2019 | Schwarz | F02C 7/18 |
| 2020/0173364 A1 * | 6/2020 | Razak | F02C 6/00 |
| 2022/0018581 A1 * | 1/2022 | Song | F25B 47/022 |

* cited by examiner

AIRCRAFT PROPULSION SYSTEM INCLUDING A HEAT EXCHANGER SYSTEM

CROSS-REFERENCES TO RELATED APPLICATIONS

This application claims the benefit of the European patent application No. 19162032.7 filed on Mar. 11, 2019, the entire disclosures of which are incorporated herein by way of reference.

FIELD OF THE INVENTION

The present invention relates to an aircraft propulsion system including a heat exchanger system, together with an aircraft including at least one such propulsion system.

BACKGROUND OF THE INVENTION

In order to supply hot air whether for a system of air, conditioned so as to guarantee the comfort of the passengers, or for a de-icing system for de-icing the outside surfaces of an aircraft, this system includes a heat exchanger system, which is schematically illustrated in FIG. 5.

The heat exchanger system 500 is disposed in the vicinity of the turbojet of the aircraft and it includes a heat exchanger 502. The turbojet is fixed to the structure of the wing due to a pylon, and the heat exchanger 502 is located between the pylon and the pylon fairing.

The heat exchanger 502 is supplied with hot air through a first supply pipe 504, which bleeds hot air from the high-pressure stage 506 or at the intermediate pressure stage 508 of the turbojet, respectively through a first valve 510 and a second valve 512. The first supply pipe 504 also includes a regulating valve 514, which enables regulation of the pressure at the inlet of the heat exchanger 502.

The heat exchanger 502 is supplied with cold air by a second supply pipe 516, which bleeds cold air from the fan duct of the turbojet. The second supply pipe 516 also includes a regulating valve 518, which regulates the quantity of cold air introduced into the heat exchanger 502 so as to regulate the temperature of the hot air exiting the heat exchanger 502.

After having passed through the heat exchanger 502, the cold air, which has been heated, is expelled to the outside through an evacuation pipe 520.

After having passed through the heat exchanger 502, the hot air, which has been cooled, is directed through a transfer pipe 522 to the air management systems like the air conditioning system or the de-icing system.

The heat exchanger system 500 includes a temperature sensor 523, which measures the temperature of the hot air exiting the heat exchanger 502 and a control unit 524, which controls the valves according to the temperature measured by the temperature sensor 523 and the temperature desired for the hot air exiting the heat exchanger 502.

The heat exchanger 502 is with cross flow, that is to say that the hot air and the cold air enter the heat exchanger 502 and exit the heat exchanger 502 along two globally perpendicular directions.

EP-A-0 934 876, US-A-2012/045317 and WO-A-2018/002855 disclose propulsion systems of the state of the art.

Actually, the size of the turbojet increases due to the necessity to increase the bypass ratio and the overall pressure ratio. Due to this increasing of the turbojet, the space allocated to the heat exchanger 502 is reduced and the air exhaust of the heat exchanger 502 is close to the leading edge of the wing, creating perturbations to the boundary layer.

SUMMARY OF THE INVENTION

An aim of the present invention is to propose an aircraft propulsion system including a heat exchanger system, which is less bulky and thus enables better integration in the propulsion system.

To that effect, an aircraft propulsion system is proposed, the propulsion system including a turbojet including an intermediate pressure stage and a high-pressure stage a fan duct, and a heat exchanger system, which includes:

- a main heat exchanger including a main hot supply connection, a main hot transfer connection pneumatically connected to the main hot supply connection through the main heat exchanger, a main cold supply connection and a main cold evacuation connection pneumatically connected to the main cold supply connection through the main heat exchanger,
- a supply pipe which is connected to the main hot supply connection, and which supplies the heat exchanger with the hot air, and which includes a regulating valve,
- a high pressure pipe which bleeds hot air from the high-pressure stage through a first valve,
- an intermediate pressure pipe which bleeds hot air from the intermediate pressure stage through a second valve, wherein the high-pressure pipe and the intermediate pressure pipe are connected to the inlet of the regulating valve,
- a transfer pipe which is connected to the main hot transfer connection, and which is adapted to transfer the hot air that has passed through the main heat exchanger to an air management system of the aircraft,
- a main supply pipe which is connected to the main cold supply connection, which supplies the main heat exchanger with cold air from the fan duct, and which includes a main regulating valve,
- an evacuation pipe which is connected to the main cold evacuation connection and is adapted to expel the air to the outside,
- a sub heat exchanger including a sub hot supply connection, a sub hot transfer connection pneumatically connected to the sub supply connection through the sub heat exchanger, a sub cold supply connection and a sub cold evacuation connection pneumatically connected to the sub cold supply connection through the sub heat exchanger, wherein the supply pipe issued from the regulating valve goes through the sub heat exchanger between the sub hot supply connection and the sub hot transfer connection,
- a sub supply pipe which is connected between the sub cold supply connection and the main supply pipe between the outlet of the main regulating valve and the main cold supply connection,
- a sub evacuation pipe which is connected to the sub cold evacuation connection and expels the air to the fan duct,
- a temperature sensor, which measures the temperature of the hot air exiting the main heat exchanger through the transfer pipe, and
- a control unit which controls the main regulating valve according to the temperature measured by the temperature sensor and the temperature desired for the hot air exiting the main heat exchanger through the transfer pipe.

The embodiment including two separate heat exchangers induces a size reduction of the main heat exchanger and a better integration in the reduced space between the pylon and the pylon fairing.

Advantageously, the propulsion system includes a pylon with a primary structure, which supports the turbojet, the main heat exchanger is located above the primary structure and in the fan duct and the sub heat exchanger is below the primary structure and in the fan duct.

Advantageously, the main cold evacuation connection is oriented backwards, the evacuation pipe comprises a first U-turn, a second U-turn and a central part disposed between the first U-turn and the second U-turn, the first U-turn is connected to the main cold evacuation connection and turns towards the front, the central part extends from back to front, and the second U-turn turns up and opens outside a fairing of a nacelle of the aircraft.

Advantageously, the U-turns have internal guiding vanes.

Advantageously, at least one of the heat exchanger comprises an external cylindrical wall, and arranged in the external cylindrical wall, a set of helixes and a set of helical tubes, the set of helixes comprises several walls, each forming an helix, and all the helixes of the set of helixes having the same axis and the same pitch, the set of helical tubes comprises several tubes, each forming an helix, and all the helixes of the set of tubes having the same axis and the same pitch, and the pitch of the walls is equal to the pitch of the tubes but in the opposite direction.

The invention also proposes an aircraft including at least one propulsion system according to one of the preceding variants.

BRIEF DESCRIPTION OF THE DRAWINGS

The aforementioned characteristics of the invention, as well as others, will emerge more clearly on reading the following description of an embodiment example, the description being made in relation to the attached drawings, among which.

DETAILED DESCRIPTION OF THE PREFERRED EMBODIMENTS

Figure 1:
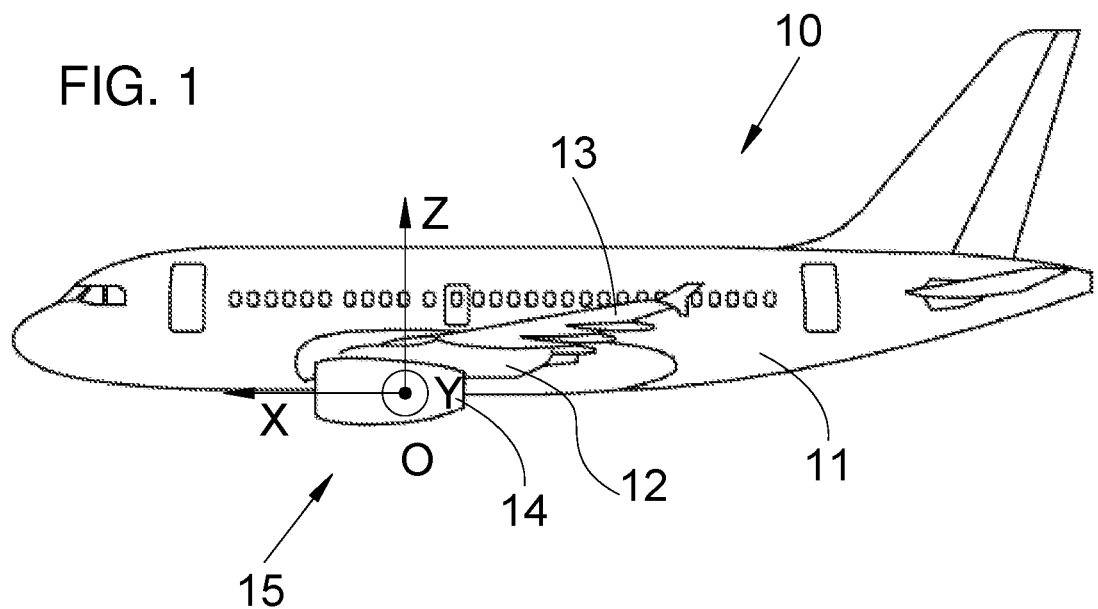
FIG. 1 is a side view of an aircraft including a heat exchanger system according to the invention.
Figure 5:
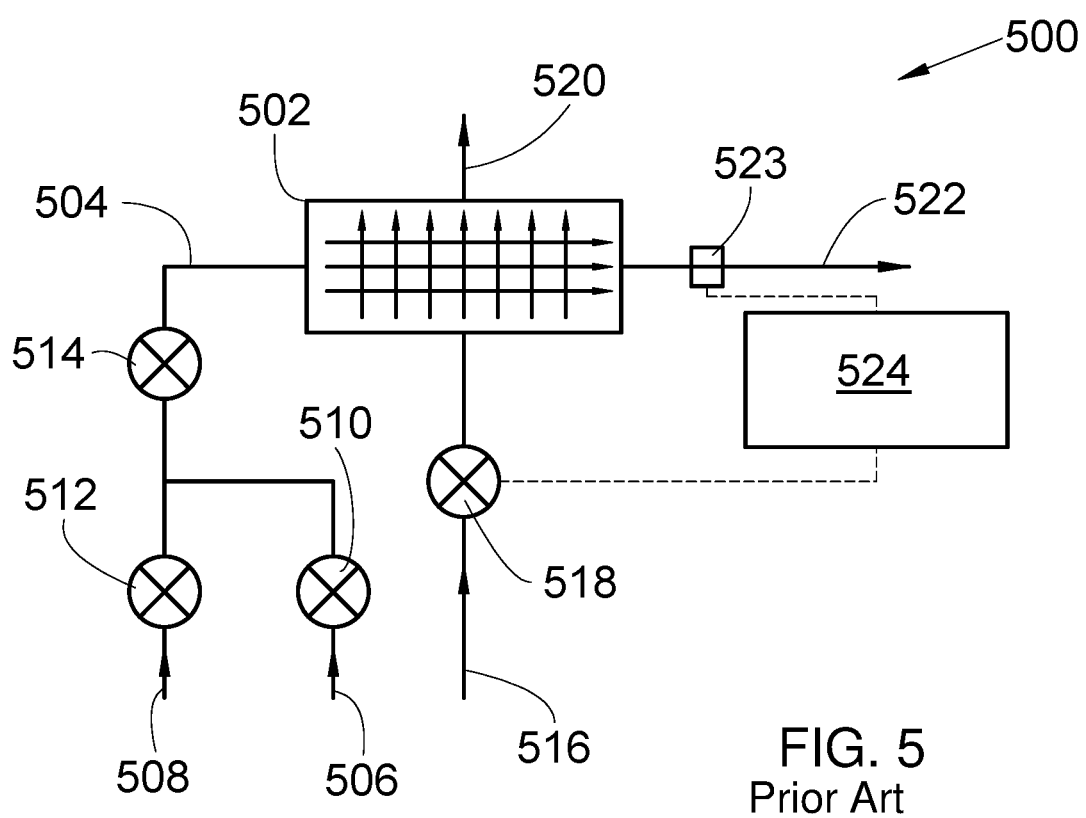
FIG. 4 shows a perspective view of a section of a heat exchanger according to the invention and FIG. 5 is a schematic illustration of a heat exchanger system of the state of the art.

In the description that follows, the terms relating to a position are taken with reference to an aircraft in normal flight position, that is to say, as illustrated on FIG. 1, and the positions "forward" and "aft" are taken in relation to the front and rear of the turbojet.

In the description that follows, and by convention, X is the longitudinal axis of the turbojet, which is parallel to the longitudinal axis of the aircraft, Y is the transversal axis, which is horizontal when the aircraft is on the ground, and Z is the vertical axis, which is vertical when the aircraft is on the ground, these three directions X, Y and Z being orthogonal to each other.

Figure 3:
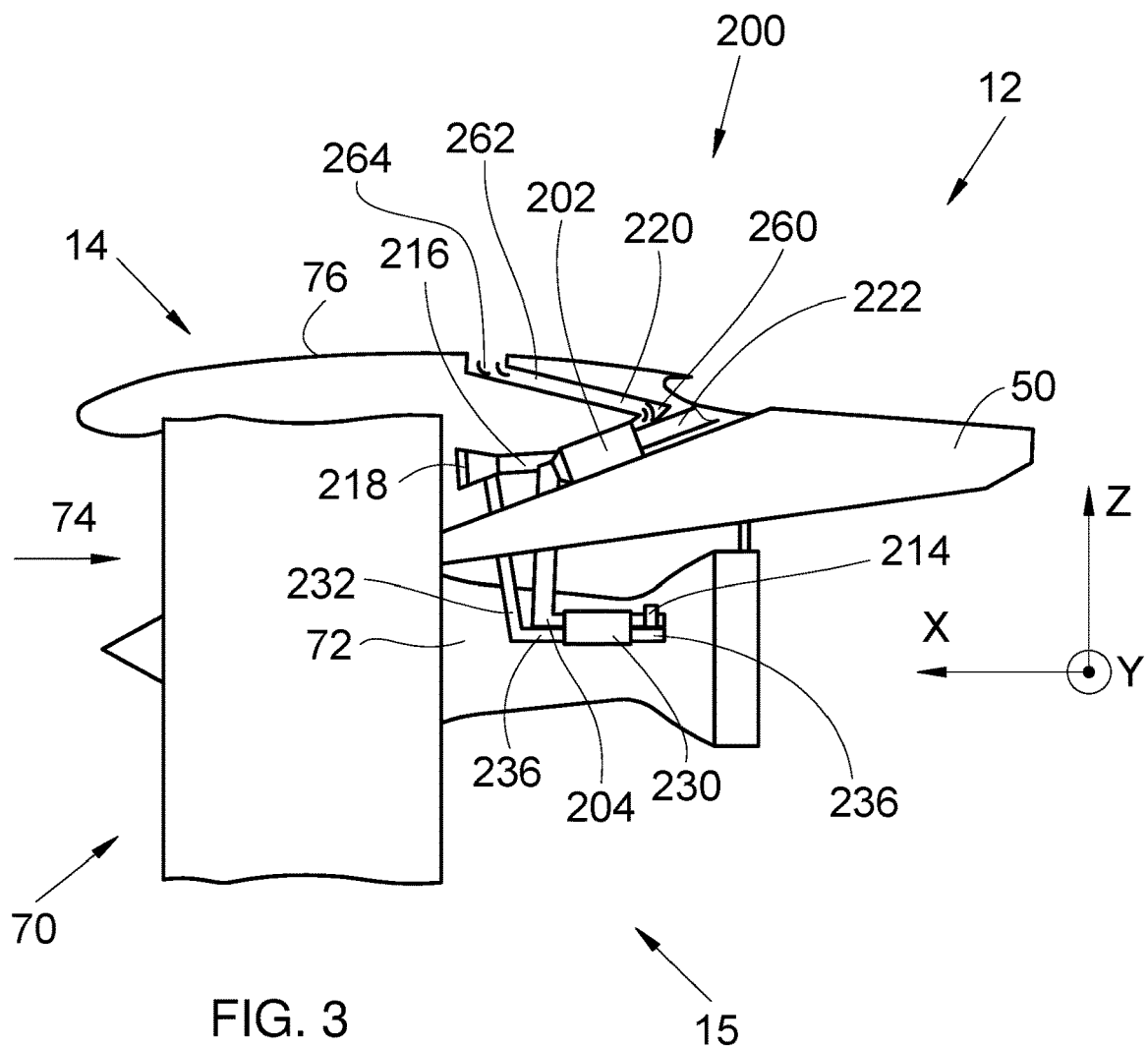
FIG. 3 shows a side view of the heat exchanger system according to the invention in its environment.

FIG. 1 shows an aircraft 10, which includes a fuselage 11, on either side of which a wing 13 is fastened that supports at least one propulsion system 15 which is shown on FIG. 3 and which includes a pylon 12 and a turbojet 70. The pylon 12 is fastened under the wing 13 and supports the turbojet 70, which conventionally includes a compression stage 72 and a fan duct 74. The pylon 12 includes a primary structure 50, which is fastened at its upper part to the structure of the wing 13 and which supports the turbojet 70 through different fastening points. In the exemplary architecture illustrated on the figures, the primary structure 50 is disposed above the turbojet 70 and its front edge is attached to the turbojet 70 inside the fan duct 74.

The compression stage 72 includes a high-pressure stage 206 and an intermediate pressure stage 208. For example, in cruise conditions at 41000 ft, the intermediate pressure at 205° C. is 35 psia, and the high pressure at 517° C. is 174 psia.

The aircraft 10 includes an air management system like, for example, an air conditioning system and/or a de-icing system.

The propulsion system 15 also includes a nacelle 14, which includes a fairing 76, which surrounds the turbojet 70, and an aerodynamic fairing of the pylon 12, which surrounds the primary structure 50.

Figure 2:
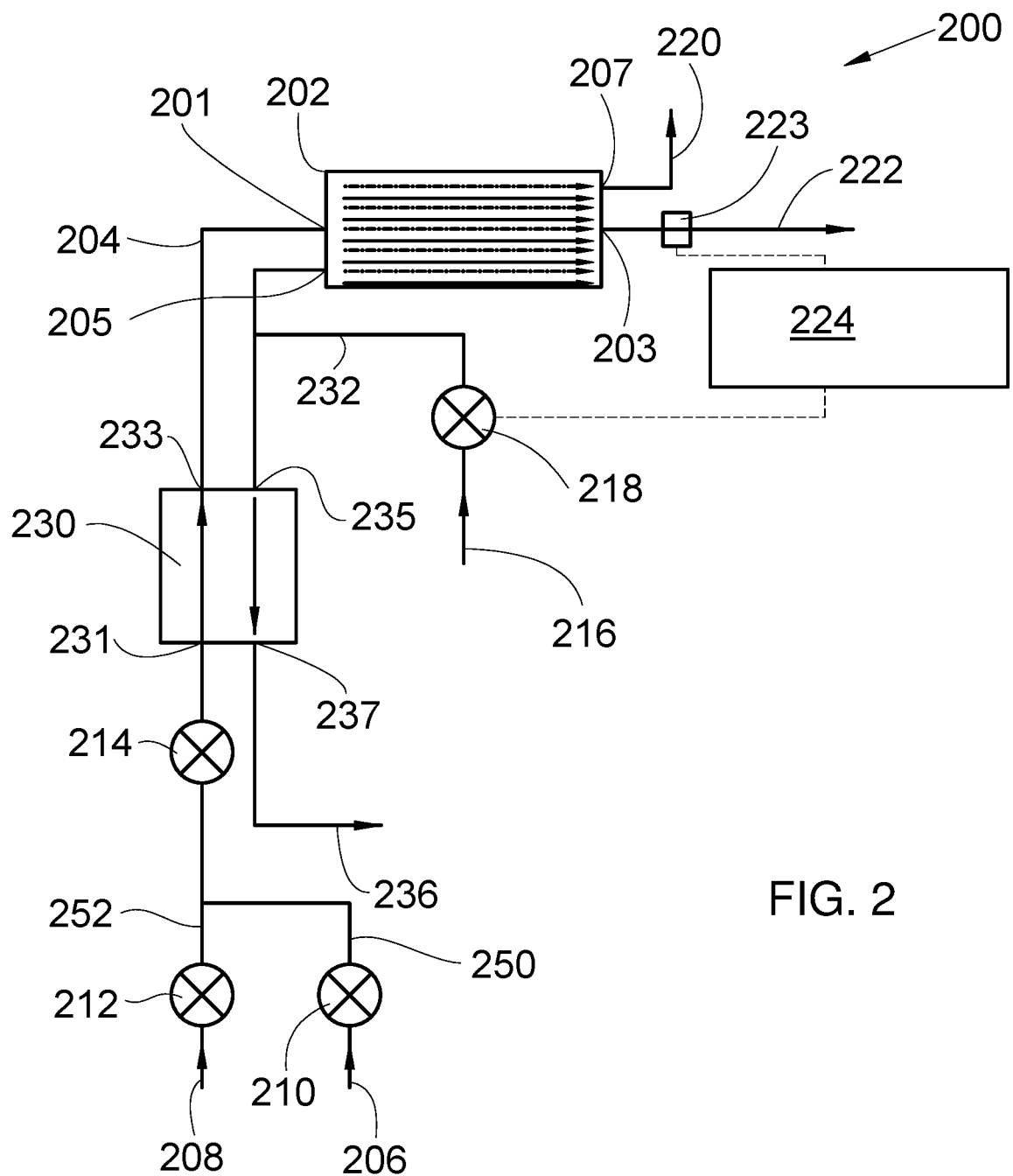
FIG. 2 is a schematic illustration of a heat exchanger system according to the invention.

FIG. 2 shows a heat exchanger system 200 according to the invention.

The heat exchanger system 200 includes a main heat exchanger 202 which comprises a main hot supply connection 201, a main hot transfer connection 203 pneumatically connected to the main supply connection 201 through the main heat exchanger 202, a main cold supply connection 205 and a main cold evacuation connection 207 pneumatically connected to the main cold supply connection 205 through the main heat exchanger 202.

The heat exchanger system 200 includes a supply pipe 204 connected to the main hot supply connection 201 and which supplies the main heat exchanger 202 with hot air and which includes a regulating valve 214, which enables regulation of the pressure at the hot supply connection 201. The supply pipe 204 is connected to the outlet of the regulating valve 214.

The heat exchanger system 200 includes a high-pressure pipe 250 which bleeds hot air from the high-pressure stage 206 through a first valve 210.

The heat exchanger system 200 includes an intermediate pressure pipe 252 which bleeds hot air from the intermediate pressure stage 208 through a second valve 212.

The high-pressure pipe 250 and the intermediate pressure pipe 252 are connected together to the inlet of the regulating valve 214.

The heat exchanger system 200 includes a main supply pipe 216 connected to the main cold supply connection 205 and which supplies the main heat exchanger 202 with cold air and which bleeds cold air from the fan duct 74 of the turbojet 70. The main supply pipe 216 also includes a main regulating valve 218, which regulates the quantity of cold air introduced into the main heat exchanger 202 so as to regulate the temperature of the hot air exiting the main heat exchanger 202.

The heat exchanger system 200 includes an evacuation pipe 220 connected to the main cold evacuation connection 207. After having passed through the main heat exchanger 202, the cold air, which has been heated, is expelled to the outside through the evacuation pipe 220.

The heat exchanger system 200 includes a transfer pipe 222 connected to the main hot transfer connection 203. After having passed through the main heat exchanger 202, the hot air, which has been cooled, is directed through the transfer pipe 222 to the air management systems like the air conditioning system or the de-icing system.

The heat exchanger system 200 includes a temperature sensor 223, which measures the temperature of the hot air exiting the main heat exchanger 202 through the transfer pipe 222 and a control unit 224, which controls the valves according to the temperature measured by the temperature sensor 223 and the temperature desired for the hot air exiting the main heat exchanger 202 through the transfer pipe 222. The control unit 224 comprises a controller, for example, a CPU («Central Processing Unit»). The control unit can be one of the control units of the aircraft 10.

The main heat exchanger 202 is here with parallel flows, that is to say, the passage of the hot air through the main heat exchanger 202 from the supply pipe 204 to the transfer pipe 222 takes place along a first transfer direction and the passage of the cold air through the main heat exchanger 202 from the main supply pipe 216 to the evacuation pipe 220 takes place along a second transfer direction parallel to the first transfer direction. On FIG. 3, the main heat exchanger 202 has such architecture where the hot air and the cold air are flowing parallel and in the same direction.

The heat exchanger system 200 includes also a sub heat exchanger 230.

The sub heat exchanger 230 comprises a sub hot supply connection 231, a sub hot transfer connection 233 pneumatically connected to the sub hot supply connection 231 through the sub heat exchanger 230, a sub cold supply connection 235 and a sub cold evacuation connection 237 pneumatically connected to the sub cold supply connection 235 through the sub heat exchanger 230.

The supply pipe 204 issued from the regulating valve 214 goes through the sub heat exchanger 230 between the sub hot supply connection 231 and the sub hot transfer connection 233.

The heat exchanger system 200 includes also a sub supply pipe 232 connected between the sub cold supply connection 235 and the main supply pipe 216 between the outlet of the main regulating valve 218 and the main cold supply connection 205. The sub supply pipe 232 supplies the sub heat exchanger 230 with cold air and bleeds cold air from the main supply pipe 216. The main regulating valve 218 regulates also the quantity of cold air introduced into the sub heat exchanger 230.

The heat exchanger system 200 includes a sub evacuation pipe 236 connected to the sub cold evacuation connection 237. After having passed through the sub heat exchanger 230, the cold air, which has been heated, is expelled to the fan duct 74 through the sub evacuation pipe 236.

The outlet of the evacuation pipe 220 is located in front of the wing 13 and to avoid that the air flowing outside through the evacuation pipe 220 heats the wing 13, the outlet of evacuation pipe 220 is far from the wing 13.

The main cold evacuation connection 207 is oriented backwards.

The evacuation pipe 220 comprises a first U-turn 260, a second U-turn 264 and a central part 262 disposed between the first U-turn 260 and the second U-turn 264.

The first U-turn 260 is connected to the main cold evacuation connection 207 and turns towards the front.

The central part 262 extends from back to front, from the first U-turn 260 to the second U-turn 264.

The second U-turn 264 turns up and opens outside the fairing 76 of the nacelle 14.

The U-turns 260, 264 have internal guiding vanes to limit pressure losses and homogenize the flow of air.

The separation of the heat exchanger into a main and a sub heat exchanger induces a size reduction of the main heat exchanger 202 and the integration of this main heat exchanger 202 in a reduced space is easier. The air is firstly cooled in the sub heat exchanger 230, and secondly in the main heat exchanger 202. The cold air used in the heat exchanger system 200 is flowing from a common inlet (216) and regulated by a single valve, i.e., the main regulating valve 218.

In the embodiment shown on FIG. 2, the sub heat exchanger 230 is with parallel flows in same directions, but in another embodiment, it can be with parallel flows in opposite directions.

FIG. 3 shows the heat exchanger system 200 of the propulsion system 15 in its environment.

The main heat exchanger 202 is located above the primary structure 50 and in the fan duct 74 and the sub heat exchanger 230 is below the primary structure 50 and in the fan duct 74. More precisely, the main heat exchanger 202 is located between the pylon and the pylon fairing.

The primary structure 50 comprises a window through which the supply pipe 204 and the sub supply pipe 232 go through.

The main regulating valve 218 takes here the form of a scoop including a door, which is mobile between an open position in which it does not blank off the scoop and a closed position in which it blanks off the scoop so as to regulate the quantity of cold air captured by the scoop. The door is motorized so as to ensure its movement and each motor is controlled by the control unit 224. The door acts as a valve. The scoop is oriented so as to be able to capture the cold air that circulates in the fan duct 74.

Figure 4:
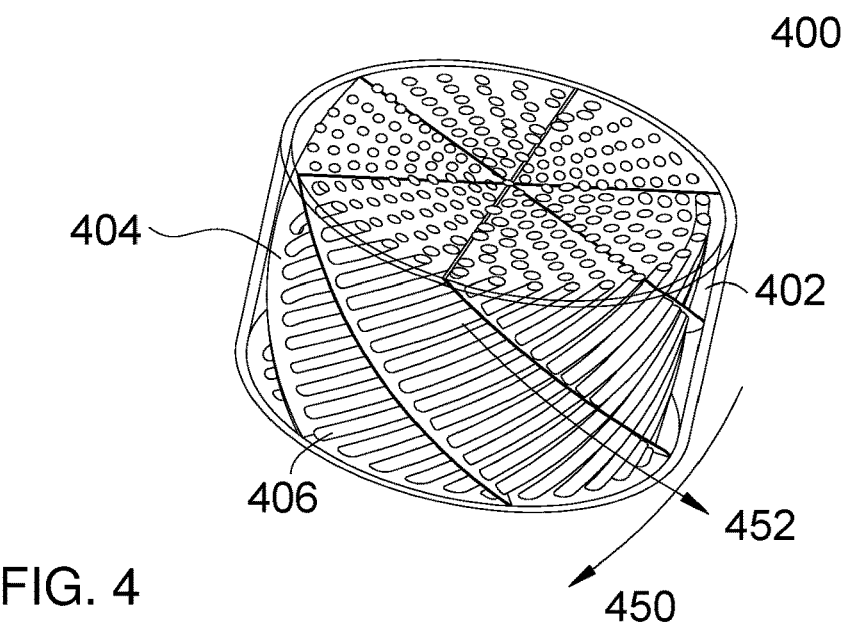

FIG. 4 shows a section of a heat exchanger 400, which can be either the main heat exchanger 202 or the sub heat exchanger 230. The heat exchanger 400 comprises an external cylindrical wall 402, and, arranged in the external cylindrical wall 402, a set of helixes and a set of helical tubes.

The set of helixes comprises several walls 404, each of these walls 404 forms an helix, and all the helixes of the set of helixes are parallel, i.e., they have the same axis and the same pitch. The axis of the helix is the axis of the external cylindrical wall 402.

The set of helical tubes comprises several tubes 406, each of these tubes 406 forms a helix, and all the helixes of the set of tubes are parallel, i.e., they have the same axis and the same pitch. The axis of the tubes is the axis of the external cylindrical wall 402.

The pitch of the walls 404 is equal to the pitch of the tubes 406 but in the opposite direction.

The hot air flows in the tubes 406 and the cold air flows between the walls 404. The general flowing direction of the hot air and the general flowing direction of the cold air can be the same or the opposite. It is also possible to guide the hot air with the walls 404 and to guide the cold air with the tubes 406.

Locally, the flowing direction 450 of the hot air follows the direction of the tubes 406 and the flowing direction 452 of the cold air follows the direction of the walls 404.

Due to this arrangement, locally the heat transfer between the hot air (450) and the cold air (452) can be assimilated to a cross flow heat exchange, and the performance of the heat transfer is improved in comparison with a conventional parallel flow heat exchanger.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, said propulsion system comprising:
   a turbojet including an intermediate pressure stage and a high-pressure stage and a fan duct, and
   a heat exchanger system, which includes:
      a main heat exchanger including a main hot supply connection, a main hot transfer connection pneumatically connected to the main hot supply connection through the main heat exchanger, a main cold supply connection and a main cold evacuation connection pneumatically connected to the main cold supply connection through the main heat exchanger,
      a supply pipe which is connected to the main hot supply connection, and which supplies the main heat exchanger with hot air, and which includes a regulating valve,
      a high-pressure pipe which bleeds hot air from the high-pressure stage through a first valve,
      an intermediate pressure pipe which bleeds hot air from the intermediate pressure stage through a second valve, wherein the high-pressure pipe and the intermediate pressure pipe are connected to an inlet of the regulating valve,
      a transfer pipe which is connected to the main hot transfer connection, and which is configured to transfer the hot air that has passed through the main heat exchanger to an air management system of the aircraft,
      a main supply pipe which is connected to the main cold supply connection, which supplies the main heat exchanger with cold air from the fan duct, and which includes a main regulating valve,
      an evacuation pipe which is connected to the main cold evacuation connection and is configured to expel air to the outside,
      a sub heat exchanger including a sub hot supply connection, a sub hot transfer connection pneumatically connected to the sub hot supply connection through the sub heat exchanger, a sub cold supply connection and a sub cold evacuation connection pneumatically connected to the sub cold supply connection through the sub heat exchanger, wherein the supply pipe issued from the regulating valve goes through the sub heat exchanger between the sub hot supply connection and the sub hot transfer connection,
      a sub supply pipe which is connected between the sub cold supply connection and the main supply pipe between an outlet of the main regulating valve and the main cold supply connection,
      a sub evacuation pipe which is connected to the sub cold evacuation connection and expels air to the fan duct,
      a temperature sensor, which measures a temperature of the hot air exiting the main heat exchanger through the transfer pipe, and
      a controller which controls the main regulating valve according to the temperature measured by the temperature sensor and a temperature desired for the hot air exiting the main heat exchanger through the transfer pipe.

2. The propulsion system according to claim 1, further including a pylon with a primary structure, which supports the turbojet, wherein the main heat exchanger is located above the primary structure and in the fan duct and wherein the sub heat exchanger is below the primary structure and in the fan duct.

3. The propulsion system according to claim 1, wherein the main cold evacuation connection is oriented backwards, wherein the evacuation pipe comprises a first U-turn, a second U-turn and a central part disposed between the first U-turn and the second U-turn, wherein the first U-turn is connected to the main cold evacuation connection and turns towards the front, wherein the central part extends from back to front, and wherein the second U-turn turns up and opens outside a fairing of a nacelle of the aircraft.

4. The propulsion system according to claim 3, wherein the first and second U-turns have internal guiding vanes.

5. The propulsion system according to claim 1, wherein at least one of the main heat exchanger or the sub heat exchanger comprises an external cylindrical wall, and arranged in the external cylindrical wall, a set of helixes and a set of helical tubes, wherein the set of helixes comprises several walls, each forming a helix, and all the helixes of the set of helixes having the same axis and the same pitch, wherein the set of helical tubes comprises several tubes, each forming a helix, and all the helixes of the set of tubes having the same axis and the same pitch, and wherein the pitch of the walls is equal to the pitch of the tubes but in an opposite direction.

6. An aircraft including at least one propulsion system according to claim 1.

* * * * *